Feb. 22, 1955 S. A. WINGATE 2,702,861

WOBBULATOR

Filed Feb. 21, 1946

INVENTOR.
SIDNEY A. WINGATE

BY M. C. Hayes

ATTORNEY

United States Patent Office 2,702,861
Patented Feb. 22, 1955

2,702,861

WOBBULATOR

Sidney A. Wingate, Boston, Mass., assignor, by mesne assignments, to the United States of America as represented by the Secretary of the Navy Application February 21, 1946, Serial No. 649,422

3 Claims. (Cl. 250—36)

This invention relates in general to electronic oscillators and in particular to constant output amplitude electronic oscillators.

For some applications it is desirable to maintain a constant output amplitude from an oscillator and especially from a signal generator oscillator used for test purposes. It is particularly desirable to maintain a constant output amplitude in a swept-frequency oscillator, commonly called a "wobbulator." Such an oscillator is one which has its output periodically swept through a frequency range. If the output from a wobbulator is coupled into a test amplifier, and the output from the amplifier is detected and coupled into an oscilloscope, the pattern presented on the oscilloscope screen will be the amplitude characteristic, or pass band, of the test amplifier. It is readily apparent that if the output amplitude from the wobbulator is not constant over its frequency range, the observed oscilloscope pattern will not be the true amplitude characteristic of the test amplifier.

Heretofore oscillators of the wobbulator type have had their output coupled into a limiter which acts to clip the positive and negative peaks from the output waveform which are above a predetermined level. If, however, the amplitude of the oscillations changes greatly, the output from the limiter may, at some frequency, be a very good sine wave but at some other frequency be almost a square wave of the same peak amplitude, which means that the fundamental frequency component of the wave is not of constant amplitude.

The principal object of this invention is to provide an electronic oscillator whose output amplitude and waveform remain substantially unchanged with variations of frequency.

Another object of this invention is to provide a wobbulator oscillator whose output amplitude and waveform remain substantially unchanged throughout the swept-frequency cycle, which oscillator can be turned on and off periodically to provide an electronic reference base line.

Other and further objects of this invention will be apparent from the following specification when taken with the accompanying drawing in which.

Figures 1, 2, 3, 4, 5, 6:
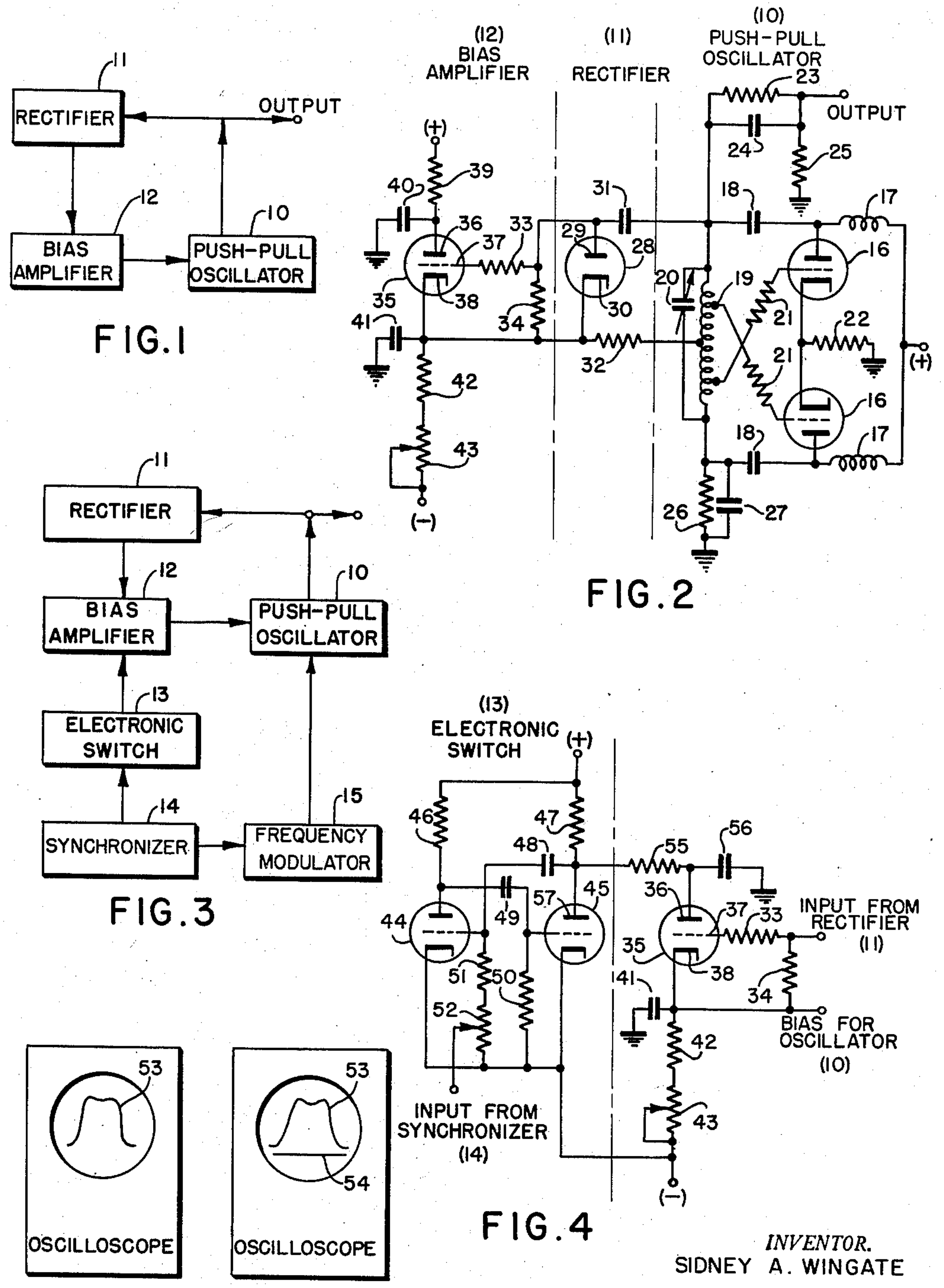
Fig. 1 is a block diagram of one embodiment of this invention.
Fig. 2 is a schematic diagram of the embodiment of Fig. 1.
Fig. 3 is a block diagram of another embodiment of this invention.
Fig. 4 is a schematic diagram of certain parts of Fig. 3.
Fig. 5 and Fig. 6 are certain oscilloscope presentations.

In the embodiment of this invention as shown in Fig. 1, a portion of the output of oscillator 10 is coupled to rectifier 11, the output from which is a D. C. voltage with its magnitude dependent upon the amplitude of the output from oscillator 10. The output from rectifier 11 is connected to bias amplifier 12 which supplies the bias voltage for oscillator 10.

Oscillator 10 must be of the push-pull type for the bias voltage to regulate the amplitude of oscillations. A push-pull type oscillator can be adjusted to operate so that the tubes do not draw grid current and when so adjusted the amplitude of oscillation depends upon the cutoff characteristics and the gain of the tubes. When operating under the above conditions, the output of the oscillator is a very good sine wave at all amplitudes.

The oscillator as shown in Fig. 2 is of conventional push-pull type composed of vacuum tubes 16 and tank circuit 19—20. For simplicity, similar parts of the oscillator are numbered the same. The plates of tubes 16 are energized from a source of positive voltage through choke coils 17 and are coupled to the tank circuit through coupling condensers 18. The grids of tubes 16 are energized from appropriate taps on inductor 19 of the tank circuit through parasitic suppressor resistors 21, and the cathodes of tubes 16 are grounded through stabilizing resistor 22. When the proper D. C. bias voltage is applied to the center tap of inductor 19 an alternating voltage is generated by the oscillator whose frequency depends upon the magnitudes of inductor 19 and condenser 20 of the tank circuit and whose amplitude depends upon the bias voltage supplied. The alternating voltage is applied to the output terminal from one side of the tank circuit through the impedance matching network composed of resistors 23 and 25 and condenser 24. Resistor 26 and condenser 27 are connected from the other side of the tank circuit to ground to balance the load on the oscillator.

The alternating voltage generated in tank circuit 19—20 is also applied to rectifier tube 28 through coupling condenser 31 to plate 29, and limiting resistor 32 to cathode 30. Rectifier tube 28 is connected as a conventional half-wave diode rectifier with load resistance 34 connected across the tube.

The negative voltage developed on plate 29 of the rectifier tube is coupled to grid 37 of amplifier tube 35 through isolating resistor 33, and cathode 30 of the rectifier tube is connected directly to cathode 38 of the amplifier tube, thus the output of rectifier 11 is applied between grid and cathode of amplifier 12 and therefore the negative voltage developed by the rectifier is the grid bias voltage of amplifier 12.

Bias amplifier 12 is a conventional D. C. amplifier with the load resistance in the cathode circuit. Plate 36 of amplifier tube 35 is connected to a positive voltage through a decoupling network composed of resistor 39 and condenser 40, the values of which are chosen to keep plate 36 at a constant potential. Cathode 38 of amplifier tube 35 is connected to a negative voltage through resistors 42 and 43 and connected to ground through condenser 41. The size of condenser 41 is chosen large enough to by-pass the ripple voltage from rectifier 11 but small enough to allow cathode 38 of amplifier tube 35 to vary with the variations of D. C. voltage developed by rectifier 11. By virtue of the aforementioned connections, cathode 38 is also connected to the center tap of inductor 19 of oscillator 10 through resistor 32, and therefore the D. C. voltage developed at cathode 38 will be the bias voltage for oscillator 10. Resistor 43 is variable to permit the bias voltage to be initially adjusted for optimum operation of the oscillator.

As an example of the operation, assume that the output amplitude from the oscillator increases. More voltage is then applied to diode 28 and consequently grid 37 of tube 35 becomes more negative with respect to cathode 38. This increases the static plate-to-cathode resistance of tube 35 and so the voltage on cathode 38 decreases. This constitutes an increase in bias voltage on the oscillator tubes 16 and therefore the output amplitude decreases to its former value. If the output amplitude of the oscillator decreases, the procedure reverses and the bias voltage on the oscillator decreases and thus increases the output amplitude to its former value.

When used as a wobbulator, the frequency of oscillator 10 may be periodically varied by connecting the shaft of variable condenser 20 to a motor, by connecting a reactance tube circuit across the tank circuit 19—20, or by any other of the well known frequency modulation methods.

As mentioned before when the output from the wobbulator oscillator is connected to the input of a test amplifier, and the amplifier output is detected and connected to an oscilloscope, the pattern on the oscilloscope will be the amplitude versus frequency characteristic of the amplifier. Such a pattern is shown as trace 53, Fig. 5. If the vertical deflection of the oscilloscope is calibrated, then the relative gain of the test amplifier can be determined at the various frequencies. Sometimes it is desirable to know the absolute gain at various frequencies. This can be readily accomplished with a modified version of the above described oscillator.

Referring to Fig. 3, oscillator 10, rectifier 11, and bias amplifier 12 are the same as previously described. Oscillator 10 is periodically swept through a frequency range by frequency modulator 15 which has its sweep period controlled by synchronizer 14. The synchronizer also controls electronic switch 13 which turns off oscillator 10 during every alternate sweep period. With this arrangement, during every alternate sweep there will be no signal fed to the test amplifier and thus no input fed to the oscilloscope. The pattern thus obtained will be as shown in Fig. 6. As trace 53 represents the amplitude versus frequency characteristic of the test amplifier and trace 54 represents zero output from the amplifier, the absolute gain of the amplifier at any frequency can be easily determined from the calibrated scope.

Electronic switch 13 as shown in Fig. 4 is a conventional multivibrator composed of electron tubes 44 and 45. The plates of tubes 44 and 45 are energized from a positive source of voltage through load resistors 46 and 47 respectively, the grids of the tubes are coupled to the opposite plates through coupling condensers 48 and 49 and are returned to the common cathodes through resistors 50, 51, and 52, and the cathodes are returned to a common negative voltage as shown.

Plate 36 of bias amplifier tube 35 is connected to plate 57 of multivibrator tube 45 through a decoupling network composed of resistor 55 and condenser 56. The resistor and condenser of this decoupling network are of such values that the voltage on plate 36 will follow the variations of voltage on plate 57 but will not follow the variations caused by grid 37; that is, the multivibrator will control the bias amplifier but the normal action of the amplifier will not affect the multivibrator.

With the connections as shown in Fig. 4, during the half cycle of multivibrator operation when tube 45 is not conducting, the voltage drop across resistor 47 is only that caused by the small current flow through tube 35 and the bias amplifier works as previously explained. During the next half cycle of operation when tube 45 is conducting, the voltage drop across resistor 47 is very large, so large that the voltage at plate 57 is only slightly higher than the negative supply voltage. Plate 57 is coupled to plate 36 and therefore the potential at plate 36 and also the potential at cathode 38 drops to very nearly the negative supply potential and consequently increases the bias on the oscillator tubes to a point where oscillation stops. Thus oscillator 10 is turned off during every alternate frequency sweep.

A common method of synchronizing the system when using a reactance tube for the frequency modulator is to use the 60 cycle line voltage for a synchronizing voltage. The multivibrator can be synchronized to operate at 30 cycles by applying a 60 cycle voltage at the input, as shown in Fig. 4, and adjusting the magnitude of the voltage to the proper value by means of potentiometer 52. The oscilloscope sweep frequency can be synchronized from the 60 cycle line voltage by conventional means and this sweep is applied to the control grid of the reactance tube. Thus the frequency sweep of the oscillator is in time phase with the horizontal sweep of the oscilloscope and the output from the oscillator is turned off every other sweep.

It is not intended that this invention be limited to the foregone details but is to be limited only by the following claims.

What is claimed is:

1. In combination with an electron tube oscillator, said oscillator being of the push-pull type and having an inductor-capacitor tank circuit, the grids of the tubes of said oscillator being energized from appropriate taps on the inductor element of said tank circuit, the output of said oscillator being a function of the bias potential applied to the grids thereof, apparatus for maintaining the output of said oscillator constant comprising, an electron rectifying tube comprising at least a plate and a cathode, a coupling capacitor connected between said plate and one terminal of said tank circuit, a limiting resistor connected between said cathode and an intermediate point on the inductor of said tank circuit, a load resistor connected between the plate and the cathode of said rectifying tube, an electron amplifier tube comprising at least a plate, a grid, and a cathode, an isolating resistor connected to the grid of said amplifier tube at one terminal, and to the plate of said rectifier tube at its other terminal, means connecting the cathodes of said rectifying tube and said amplifier tube, a source of biasing potential, a resistor load connected between said biasing potential source and the cathode of said amplifier tube, a source of positive supply potential, a decoupling network comprising a resistor and a capacitor connected between said source of positive supply potential and the plate of said amplifier tube for maintaining the potential of said plate of said amplifier tube constant, and a capacitor connected to said cathode of said amplifier tube adapted to by-pass any ripple voltage emanating from said rectifier tube.

2. The combination of claim 1, and synchronizing means, means responsive to said synchronizing means for periodically varying the frequency of said oscillator, and means also responsive to said synchronizing means for periodically applying a potential of a predetermined magnitude to said plate of said amplifier tube whereby the potential of said cathode of said amplifier tube is periodically lowered to a predetermined value at which the oscillator is inoperative.

3. Apparatus for use with an oscillator, said oscillator being of the push-pull type where the output is a function of the magnitude of the bias potential at the grids of the oscillator tubes, comprising, an electron tube rectifier for rectifying a portion of the output of said oscillator, an electron tube direct current amplifier for amplifying the output of said rectifier and obtaining a signal reversed in polarity and amplified with respect to the output of said rectifier, means for coupling said signal to the grids of said oscillator tubes whereby the output of said oscillator is maintained substantially constant, synchronizing means, means responsive to said synchronizing means for periodically varying the frequency of said oscillator and means also responsive to said synchronizing means for periodically rendering said oscillator inoperative in synchronism with said periodic variation in frequency.

References Cited in the file of this patent

UNITED STATES PATENTS

| | | |
|---|---|---|
| 2,264,369 | Golicke | Dec. 2, 1941 |
| 2,287,925 | White | June 30, 1942 |
| 2,318,061 | Dailey | May 4, 1943 |
| 2,373,437 | Vanderlyn et al. | Apr. 10, 1945 |
| 2,391,085 | Crandell | Dec. 18, 1945 |